(12) United States Patent
Wang et al.

(10) Patent No.: US 11,280,338 B2
(45) Date of Patent: Mar. 22, 2022

(54) SUBMERSIBLE PUMP

(71) Applicant: Leo Group Pump (Zhejiang) Co., Ltd., Zhejiang (CN)

(72) Inventors: Jian Wang, Zhejiang (CN); Shijun Qiu, Zhejiang (CN)

(73) Assignee: Leo Group Pump (Zhejiang) Co., Ltd., Wenling (CN)

( * ) Notice: Subject to any disclaimer, the term of this patent is extended or adjusted under 35 U.S.C. 154(b) by 189 days.

(21) Appl. No.: 15/957,995

(22) Filed: Apr. 20, 2018

(65) Prior Publication Data
US 2019/0120233 A1  Apr. 25, 2019

(30) Foreign Application Priority Data

Aug. 31, 2017 (CN) .......................... 201710769990.9

(51) Int. Cl.
  *F04D 13/06*  (2006.01)
  *F04D 29/42*  (2006.01)
  *F04D 13/08*  (2006.01)
  *F04D 15/02*  (2006.01)

(52) U.S. Cl.
  CPC ......... *F04D 13/068* (2013.01); *F04D 13/086* (2013.01); *F04D 15/0218* (2013.01); *F04D 29/426* (2013.01)

(58) Field of Classification Search
  CPC ............... F04D 13/068; F04D 13/0686; F04D 15/0218; F04D 28/426; F04D 29/426; F04D 13/06; F04D 13/08; F04D 13/086; F04D 25/0686; F04D 25/0673; F04D 29/40
  USPC ........................................ 417/411; 248/125.3
  See application file for complete search history.

(56) References Cited

U.S. PATENT DOCUMENTS

| | | | | |
|---|---|---|---|---|
| 4,218,195 A * | 8/1980 | Shure | ..................... | F04D 13/086 417/411 |
| 5,833,437 A * | 11/1998 | Kurth | ..................... | F04D 13/024 417/36 |
| 6,375,430 B1 * | 4/2002 | Eckert | ................. | F04D 15/0218 417/36 |
| 6,447,261 B1 * | 9/2002 | McCook | ................. | F04B 17/03 417/234 |
| 7,798,339 B2 * | 9/2010 | Brooks | .................. | G11B 33/02 211/103 |
| 8,894,389 B2 * | 11/2014 | Meza | ....................... | F04B 17/06 417/411 |
| 2018/0028929 A1 * | 2/2018 | Saxton | ................... | A63H 23/14 |

* cited by examiner

*Primary Examiner* — Philip E Stimpert
(74) *Attorney, Agent, or Firm* — Westbridge IP LLC

(57) ABSTRACT

A submersible pump comprising a pump body and a top cover, wherein the pump body is detachably connected to the top cover, and it is sealed and isolated between the inside of the pump body and the inside of the top cover; the submersible pump also comprises a battery for powering the submersible pump and the battery is provided within the top cover. The submersible pump described in the disclosure is easy to use and carry.

8 Claims, 5 Drawing Sheets

SUBMERSIBLE PUMP

CROSS-REFERENCE TO RELATED APPLICATIONS

The present application claims priority from Chinese patent Application No. CN2017107699909 filed on Aug. 31, 2017, the entire contents of which are incorporated herein by reference.

TECHNICAL FIELD

The present invention relates to the technical field of water pump, in particular to a submersible pump.

BACKGROUND

Submersible pump is a deep well water lifting equipment. When in use, the whole pump unit dives into the water to draw underground water onto the surface, which can be used for domestic water, mine rescue, industrial cooling, farmland irrigation, sea water lifting, ship loading, and landscape fountains.

The existing submersible pump is supplied electricity in two ways: by using power cord to connect to an external power supply equipment or by using an external battery pack.

However, in the process of implementing the present invention, the inventor of the present invention finds that at least the following problems exist in the power supply modes of the submersible pump in the prior art:

1. Subjected to the position of the power supply, the submersible pump needs to use a very long power cord, so that it is inconvenient for use and also problematic for the location and storage of the power cord; and 2. When the external battery pack is used, it is also needed a very long power cord to connect it for supplying power, so that, similarly, it is inconvenient for use and also problematic for the location and storage of the power cord.

SUMMARY

In view of this, an object of the invention is to provide a more convenient submersible pump.

Based on the above object, the invention provides a submersible pump, comprising a pump body and a top cover, wherein the pump body is detachably connected to the top cover, and it is sealed and isolated between the inside of the pump body and the inside of the top cover.

The submersible pump also comprises a battery for powering the submersible pump, wherein the battery is provided within the top cover.

Optionally, the submersible pump further comprises a battery box, wherein the battery box is provided within the top cover and the battery is located in the battery box.

Optionally, the battery box comprises a battery box body with an opening, a battery box cover and a first screw, wherein a first hollow stud is arranged on an inner surface of the top cover.

Optionally, a first screw hole is arranged on the battery box body and a second screw hole is arranged on the battery box cover, wherein the first screw passes through the second screw hole and the first screw hole to threadedly connect with the first hollow stud.

Alternately, a first screw hole is arranged on the battery box body, wherein the first screw passes through the first screw hole to threadedly connect with the first hollow stud, and the battery box cover is fit with the batter box body by locking connection.

Optionally, a second hollow stud is provided on the outer sidewall of the battery box body, the first screw hole is arranged on the center of the second hollow stud, and the first screw is capable of engaging with the second hollow stud by threaded connection.

Optionally, a drive circuit is further provided within the battery box.

Optionally, a charging connector is provided on the top of the top cover, wherein one end of the charging connector is exposed on the outer top surface of the top cover, and the other end of the charging connector is electrically connected with the drive circuit.

Optionally, a waterproof cover is provided on the end of the charging connector exposed on the outer top surface of the top cover.

Optionally, the submersible pump further comprises a float switch and a switch circuit, wherein the float switch is connected with the switch circuit, and the switch circuit is provided between the battery and the drive circuit.

Optionally, the submersible pump further comprises a switch connecting line, wherein one end of the switch connecting line is electrically connected with the float switch, and the other end of the switch connecting line is electrically connected with the switch circuit.

Optionally, a switch connector is provided on the top of the top cover, wherein one end of the switch connector is exposed on the outer top surface of the top cover, the other end of the switch connector is electrically connected with the switch circuit, and the switch circuit is electrically connected with the drive circuit, and the switch connecting line is connected with the switch circuit via the switch connector.

Optionally, the submersible pump further comprises a driving component, an impeller and a base, wherein the driving component is provided within the pump body and electrically connected with the drive circuit, the impeller is connected to an end of the driving component facing the base, a pressure chamber is formed between a housing of the driving component and a housing of the pump body, the base is provided on the bottom of the pump body, and a water inlet is provided on the base.

Optionally, a first water outlet pipe is provided on a sidewall of the pump body, a second water outlet pipe is provided on a sidewall of the top cover, and a water outlet of the submersible pump is provided on the top of the second water outlet pipe, when the submersible pump is assembled, one end of the first water outlet pipe communicates with the pressure chamber, and the other end of the first water outlet pipe communicates with the second water outlet pipe.

Optionally, the second water outlet pipe forms a convex arm on a sidewall of the top cover; the submersible pump further comprises a float switch and a adjusting device, the float switch is connected with the drive circuit and the battery via the switch circuit, the adjusting device is provided on an outer sidewall of the convex arm, and one end of the float switch is connected to the adjusting device, so that the adjusting device can drive the float switch to move in a direction perpendicular to the water surface.

Optionally, the adjusting device comprises a U-shaped clip and a first rail and a second rail provided on an outer sidewall of the convex arm in a radial direction of the submersible pump, one end of the float switch is connected to the U-shaped clip, a first latch is provided equidistantly on the first rail and the second rail, a second latch is provided on the inner surfaces of both ends of the U-shaped clip, and the first latch and the second latch are able to be snap-fitted each other.

Optionally, the driving component comprises a driving component housing, a driving component top cover and a driving component driving unit, wherein the driving component driving unit is provided within an accommodating space formed inside the driving component housing and the driving component top cover.

Optionally, a first flange is circumferentially arranged on an outer sidewall of the housing of the driving component, a second flange is circumferentially arranged on an outer sidewall of the top cover of the driving component, a third flange is circumferentially arranged on an inner sidewall of the pump housing, and the second flange is attached to the first flange, the first flange abuts on the third flange, and a first seal is provided between the first flange and the third flange.

Optionally, the submersible pump further comprises a second screw, wherein a third screw hole is formed on the third flange, a fourth screw hole is formed on an inner sidewall of the top cover, and the second screw passes through the third screw hole to threadedly connected with the fourth screw hole; and/or a first slot is formed on the third flange, and the top cover comprises a first shell and a second shell, wherein the first shell is formed on one side close to the interior of the top cover, the bottom of the first shell is capable of snap-fitting with the first slot; a second slot is formed on top edge of the housing of the pump body, the bottom of the second shell is capable of snap-fitting with the second slot, and a second seal is provided between the second shell and the second slot.

Optionally, a test hole is provided on the top of the top cover, and the test hole is plugged by a third screw.

Optionally, the submersible pump further comprises an annular handle, and an annular plane of the annular handle is perpendicular to the top surface of the top cover.

Optionally, a non-slip protrusion is provided on an inner surface of the annular handle away from the top cover.

It can be seen from the above that the submersible pump of the present disclosure can be powered by a built-in battery to eliminate the need for connection with an external power supply or an external battery pack via power cord and make it easier to use, since the top cover and the pump body are isolated and sealed each other and a battery for supplying power to the submersible pump is provided in the top cover.

BRIEF DESCRIPTION OF DRAWINGS

In order to further clearly describe the technical solutions of the present disclosure, a brief description will be given to the drawings which are used in the embodiments. Apparently, the drawings described below are merely some examples of the present disclosure. As for an ordinary person skilled in the art, other drawings can also be derived based on the present drawings without any creative attempt.

DETAILED DESCRIPTION OF ILLUSTRATIVE EMBODIMENTS

In order to further clarify the object, technical solutions and advantages of the present disclosure, a clear, complete and detailed description will be further given to the technical solutions of the embodiments of the present disclosure. It is apparent that the embodiments described herein are merely some but not all examples of the present disclosure. All the other embodiments derived from the embodiments of the present disclosure by an ordinary person skilled in the art fall in the scope of the present disclosure. To make the objectives, technical solutions, and advantages of the present disclosure clearer, it is further described in detail below with reference to the accompanying drawings.

It should be noted that all the expressions using the words of "first" and "second" in the present disclosure are used to distinguish two entities with the same name, and it can be seen that the "first" and the "second" are just used for convenience of description, it should not be construed as a limitation on the embodiments of the present disclosure.

Figure 1:
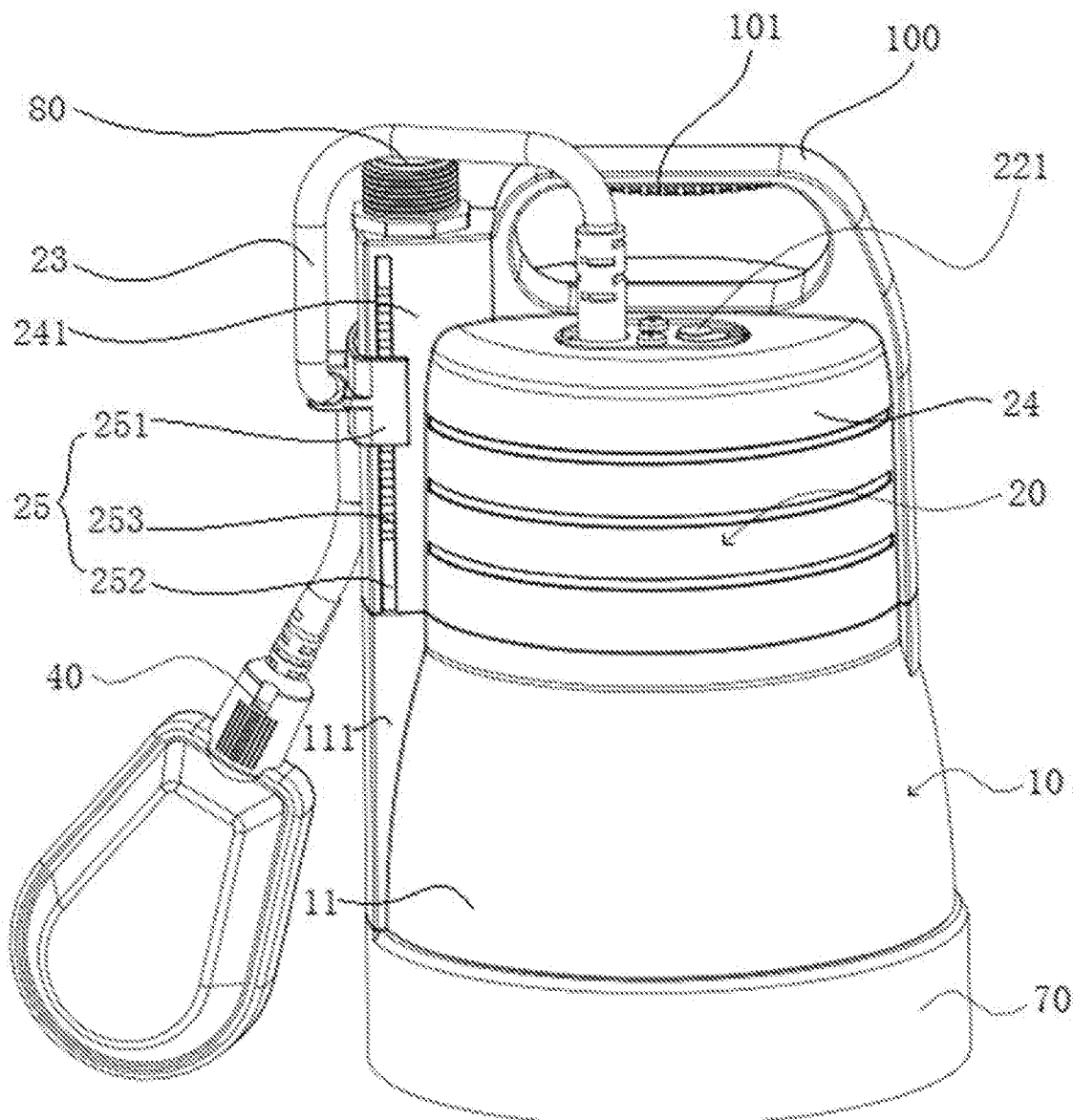
FIG. 1 is a schematic structural view of an embodiment of a submersible pump according to the present invention.
Figure 2:
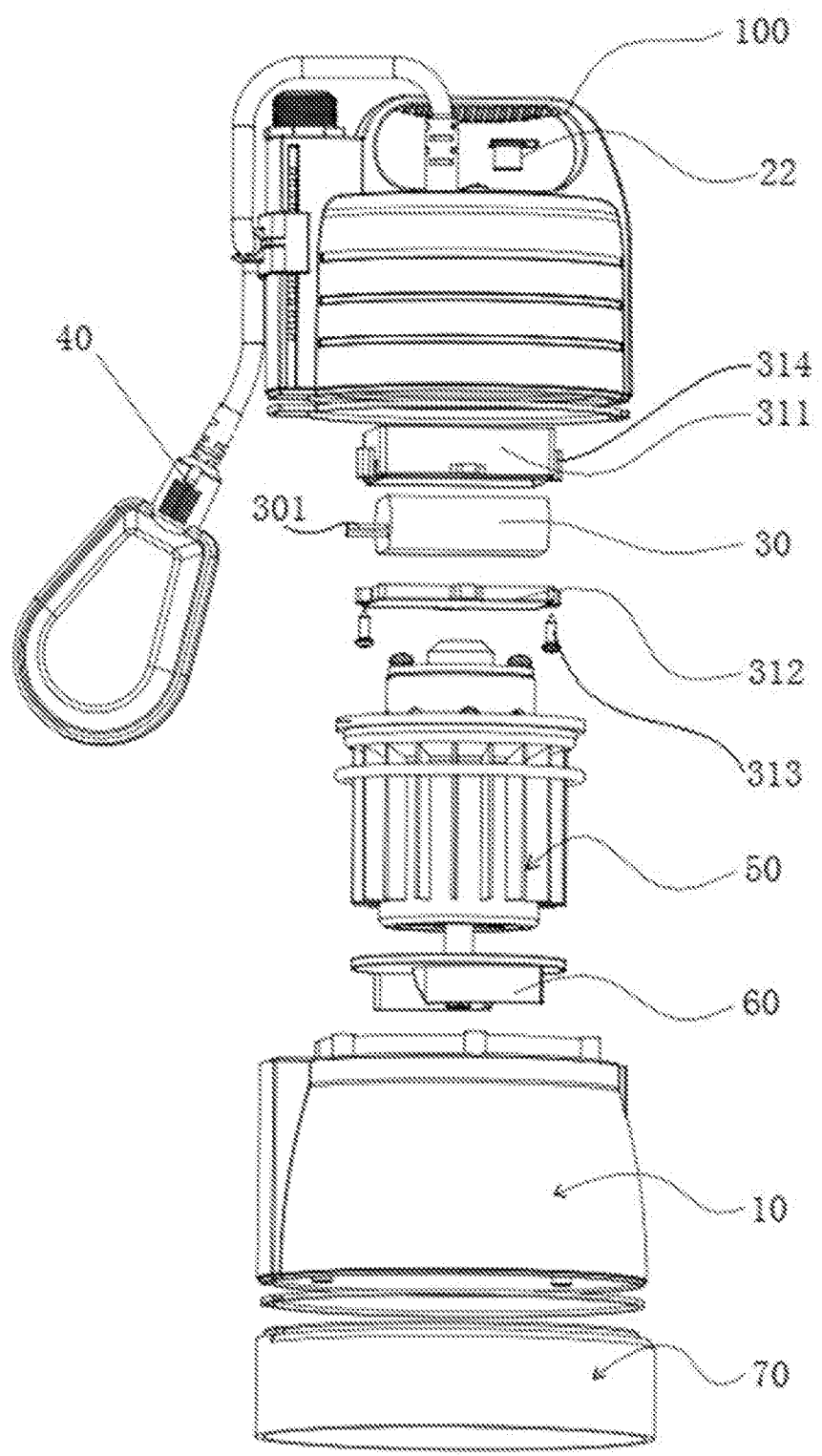
FIG. 2 is a schematic exploded view of an embodiment of a submersible pump according to the present invention.
Figure 3:
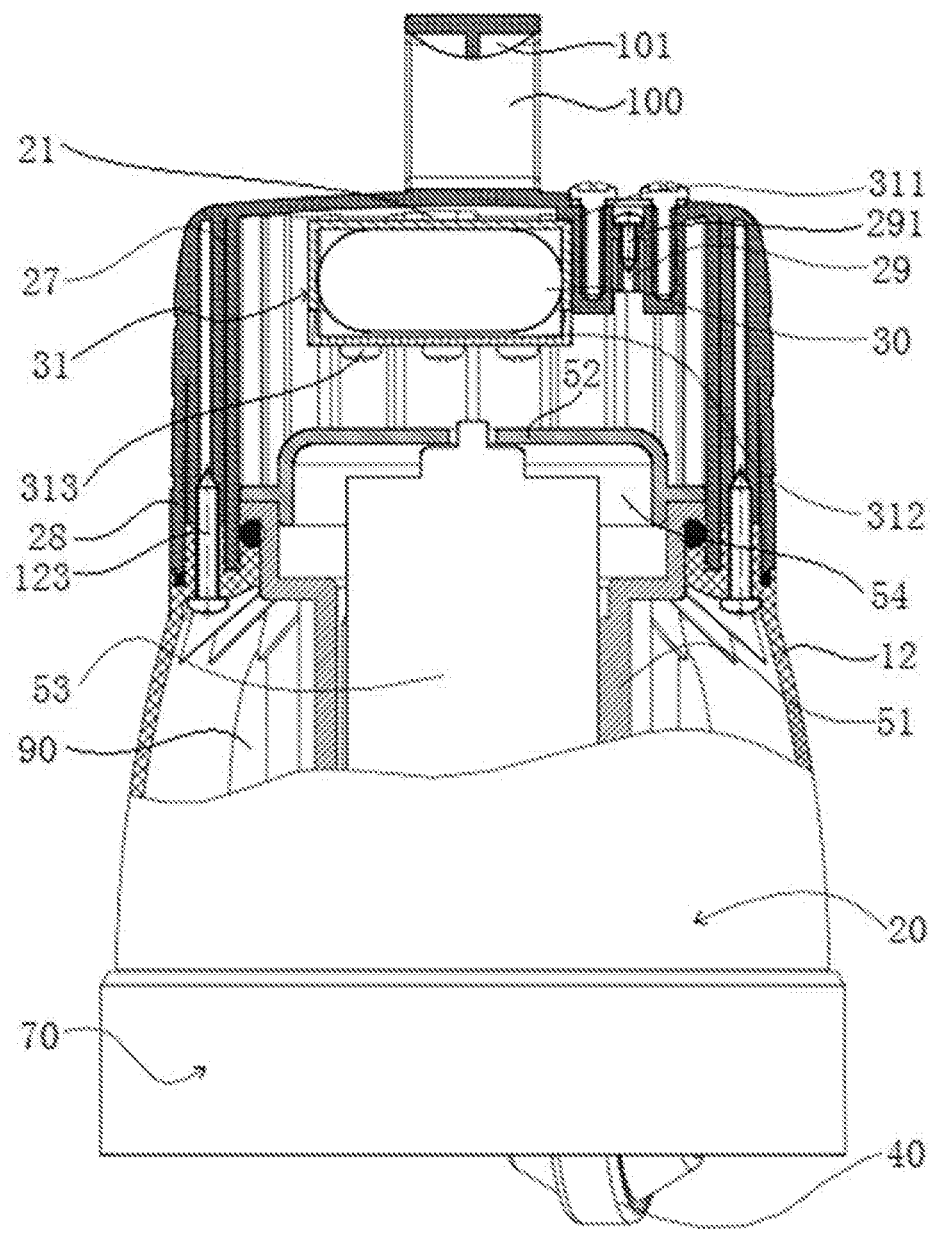
FIG. 3 is a partially cutaway schematic structural view of an embodiment of a submersible pump according to the present invention.

As shown in FIGS. 1-3, the submersible pump comprises a pump body 10 and a top cover 20, the pump body 10 is detachably connected to the top cover 20, and it is sealed and isolated between the inside of the pump body 10 and the inside of the top cover 20.

The submersible pump further comprises a battery 30 for supplying power to the submersible pump, and the battery 30 is arranged within the top cover 20.

The submersible pump can be powered by a built-in battery without the need for connection with an external power supply or an external battery pack via power cord and make it easier to use, since the top cover 20 and the pump body 10 axe isolated and sealed, and a battery 30 for supplying power to the submersible pump is provided in the top cover 20.

As an embodiment of the present disclosure, as shown in FIG. 3, the submersible pump further comprises a battery box 31. The battery box 31 is disposed within the top cover 20, and the battery 30 is embedded in the battery box 31. In this way, the battery 30 is arranged in the battery box 31, so that the battery 30 can be stably and firmly fixed inside the top cover 20.

As an embodiment of the present disclosure, the battery box 31 comprises a battery box body 311 having an opening, a battery box cover 312 and a first screw 313. A first hollow stud 21 is arranged on an inner surface of the top cover 20.

A first screw hole is arranged on the battery box body 311 and a second screw hole is arranged on the battery box cover 312. The first screw 313 passes through the second screw hole and the first screw hole to threadedly connect with the first hollow stud 21. As shown in FIG. 2, the first screw hole and the second screw hole can be respectively arranged at disposed corresponding locations on the battery box body 311 and the battery cover 312 (which may not be arranged on the both opposite sidewalls shown in FIG. 2, but at any locations). The first hollow stud 21 is also arranged on the inner surface of the top cover 20 that is opposite to the first screw hole and the second screw hole, so that when the battery box 31 needs to be fixed, the first screw 313 can pass through the second screw hole and the first screw hole to threadedly connect with the first hollow stud, and the battery box 31 and the top cover 20 is fixedly connected. It is advantageous that the battery box 31 and the top cover 20 can be more easily fixed. and relatively easy to remove.

Alternatively, as another embodiment of the present disclosure, a first screw hole is arranged on the battery box body 311, and the first screw 313 is threadedly connect with the first hollow stud through the first screw hole, and the battery cover 312 is snap-fitted with the battery box body 311. In this way, it cannot be limited to the locations of the battery 30 in the battery box 31, and the first screw hole may be arranged at any location on the battery box body 311, so as to facilitate the fixing between the battery box body 311 and the top cover 20. The snap-fit between the battery cover 312 and the battery box body 311 makes the battery cover 312 can be conveniently mounted and removed, and also facilitate the battery 30 to be loaded and unloaded.

Alternatively, as another embodiment of the present disclosure, as shown in FIG. 2, a second hollow stud 314 is arranged on an outer sidewall of the battery box body 311, and the first screw hole is arranged at the center of the second hollow stud 314, so that the first screw 313 can be threadedly connected with the second hollow stud 314, that is, the first screw 313 can pass through a second screw hole (which is also arranged at both ends of the battery cover 312 corresponding to the second hollow studs 314) and the second hollow studs 314 to threadedly connect with the first hollow studs 21 on the inner surface of the top cover 20. In this way, the first screw hole and the second screw hole for fixing are arranged on the outer-wall of the battery box 31, so that it cannot be blocked for the placement of the battery 30 in the battery box 31 and the battery 30 also can be loaded and unloaded more easily.

As an embodiment of the present disclosure, referring to FIG. 2, an electrode line 301 for connecting with an external circuit is provided on the battery 30. Correspondingly, a groove for the electrode line 301 passing therethrough is provided on the battery box 31 (optionally, the groove is provided on the battery box body 311), so that the electrode line 301 can be easily led out of the battery box 31 when the battery 30 is placed in the battery box 31.

As an embodiment of the present disclosure, a drive circuit (not shown) is further provided inside the battery box, so that the drive circuit can be stably fixed within the top cover 20, and the drive circuit is not easy to shift or shake due to the limitation of the battery box 31.

As an embodiment of the present disclosure, referring to FIG. 1 and FIG. 2, a charging connector 22 is provided on the top of the top cover 20, one end of the charging connector 22 exposed on the outer top surface of the top cover 20, and the other end of the charging connector 22 electrically connected to the drive circuit, so that the external power supply can charge the battery 30 by plugging the charging cable to the charging connector 22. When the drive circuit is provided within the battery box 31 and the charging connector 22 is provided on the top of the top cover 20, the circuit structure can be designed to be more compact. Preferably, with reference to FIG. 1 and FIG. 2, a waterproof cover 221 is provided at an end of the charging connector 22 exposed on the outer top surface of the top cover 20, so that when no charging, the waterproof cover 221 can enclose the charging connector 22 to prevent dust or liquid easily causing the charging connector 22 to malfunction from entering into. Preferably, one end of the waterproof cover 221 is connected to the charging connector 22, so as to prevent the waterproof cover 221 from being lost due to being removed or falling off.

As one embodiment of the present disclosure, referring to FIG. 1, the submersible pump further comprises a float switch 40 and a switch circuit (not shown), and the float switch 40 is connected to a switch circuit disposed between the battery 30 and the drive circuit. In the case that the submersible pump is placed in the scene to be operated, when the liquid level reaches a certain level, the float switch 40 is triggered to emit a corresponding electrical signal to the switch circuit to control the switch circuit to be turned on or off, such that the power supply line between the battery 30 and the drive circuit is turned on or off. In this way, the submersible pump is controlled to be turned on or off by the float switch 40, and the submersible pump is turned on or off in relation to the level of the liquid in the work scene.

As an embodiment of the present disclosure, as shown in FIG. 1, the submersible pump further comprises a switch connecting line 23, one end of the switch connecting line 23 electrically connected with the float switch 40 and the other end of the switch connecting wire 23 electrically connected with the switch circuit, so as to transmit the electrical signal of the float switch 40 to the switch circuit through the switch connecting line. Optionally, a switch connector (not shown) is provided on the top of the top cover 20. Similar to the charging connector 22, one end of the switch connector is exposed on the outer top surface of the top cover 20, the other end of the switch connector is electrically connected with the switch circuit, the switch circuit is electrically connected with the drive circuit, and the switch connecting line 23 is connected to the switch circuit via the switch connector.

As an embodiment of the present disclosure, referring to FIG. 2 and FIG. 3, the submersible pump further comprises a driving component 50, an impeller 60 and a base 70.

The driving component 50 is provided inside the pump body 10 and electrically connected to the drive circuit. The impeller 60 is connected to one end of the drive component facing the base 70. A pressure chamber 90 is formed between the housing of the driving component 50 and the housing of the pump body 10. The base 70 is provided at the bottom of the pump body 10, and a water inlet is arranged on the base 70 (optionally, the base 70 has a disk shape having an opening at one end, and the water inlet for pumping liquid is arranged at the center of the bottom surface of the base 70 in the shape of a disk).

As an embodiment of the present disclosure, referring to FIG. 1 and FIG. 2, a first outlet pipe 111 is provided on a side wall 11 of the pump body 10, a second outlet pipe 241 is provided on a side wall 24 of the top cover 20, and a outlet 80 of the submersible pump is located at the top of the second outlet pipe 241. When the submersible pump is assembled, one end of the first outlet pipe 111 is communicated with the pressure chamber 90, and the other end of the first outlet pipe 111 is communicated with the second outlet pipe 241, so that the liquid pumped in from the inlet of the submersible pump can enter into the pressure chamber 90 through the first outlet pipe 111, and then pumped out of the outlet 80 through the first outlet pipe 111 and the second outlet pipe 241.

Figure 1A:
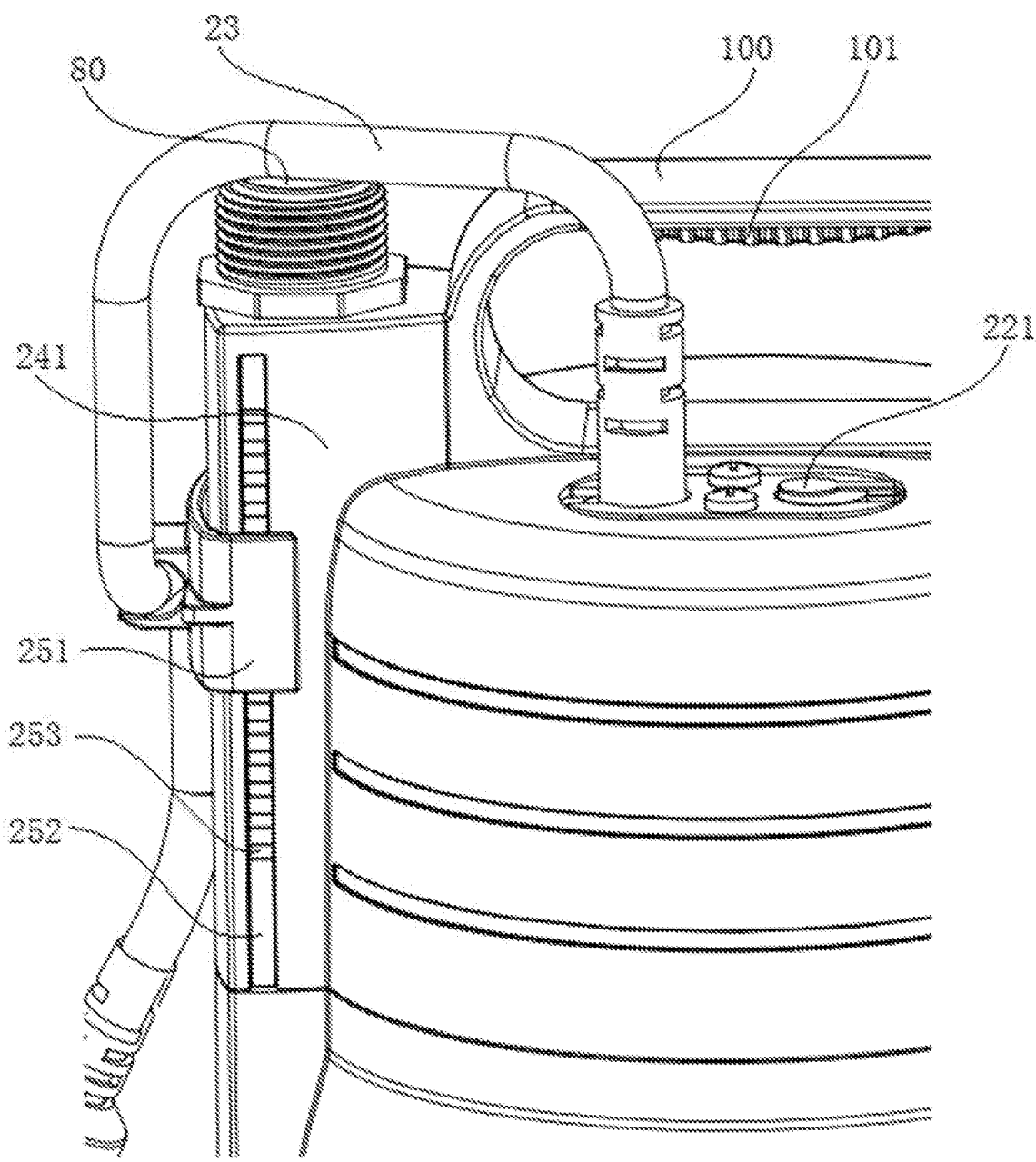
FIG. 1a is an enlarged schematic view of a portion of an embodiment of the submersible pump shown in FIG. 1.

As an embodiment of the present disclosure, referring to FIG. 1 and FIG. 1a, the second outlet pipe 241 forms a convex arm on the sidewall 24 of the top cover 20. The submersible pump further comprises a float switch 40 and an adjusting device 25, the float switch 40 is electrically connected to the drive circuit and the battery 30 via a switch circuit. The adjusting device 25 is located on the outer sidewall of the convex arm, and one end of the float switch 40 is connected to the adjusting device 25, so that the adjusting device 25 can drive the float switch 40 to move in a direction perpendicular to the liquid level so as to adjust the switch timing of the float switch 40 according to the liquid level.

As an embodiment of the present disclosure, referring to FIG. 1 and FIG. 1*a*, the adjusting device 25 comprises a U-shaped clip 251 and a first rail 252 and a second rail (not shown, which is formed on back of the convex arm shown in FIG. 1) formed on the outer sidewall of the convex arm in a radial direction of the submersible pump. One end of the float switch 40 is connected to the U-clip 251. First latches 253 are equidistantly arranged on the first rail 252 and the second rail, second latches (not shown) are arranged on the inner surface of both ends of the U-clip, and the first latch 253 and the second latch can be engaged with each other, so that the height of the float switch 40 can be adjusted by adjusting the position of the second latch on the first rail 252 and the second rail to be more convenient to use.

As an embodiment of the present disclosure, as shown in FIG. 3, the driving component 50 comprises a driving component housing 51, a driving component top cover 52 and a driving component drive unit 53 for driving the impeller 60 to rotate. The driving component drive unit 53 is provided in an accommodating space 54 which formed within the driving component housing 51 and the driving component top cover 52.

As an embodiment of the present disclosure, the drive unit 53 is a direct current motor. Optionally, the direct current motor may be a brushed direct current motor or a brushless direct current motor.

Figure 3A:
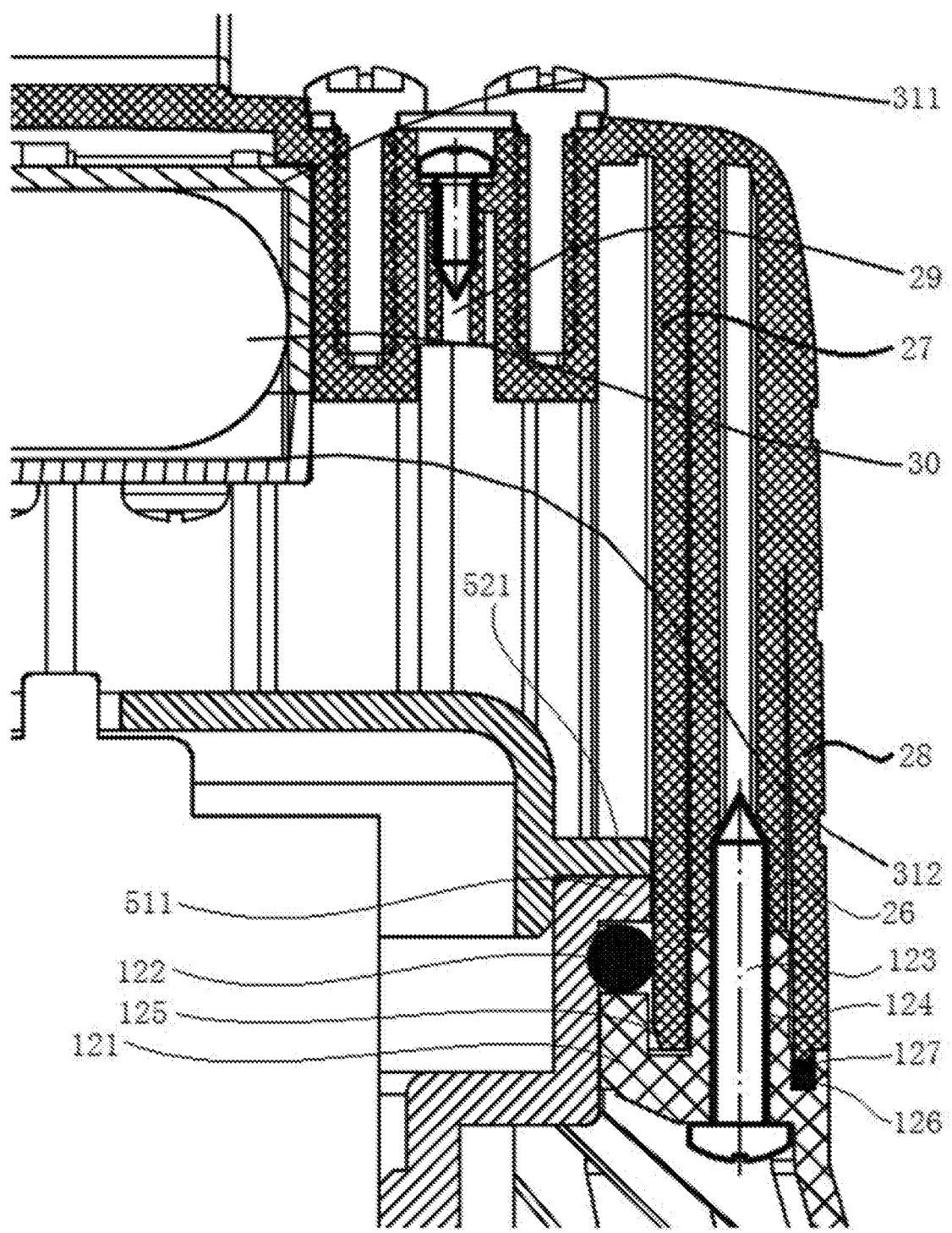
FIG. 3a is an enlarged schematic view of a portion of an embodiment of the submersible pump shown in FIG. 3.

As an embodiment of the present disclosure, as shown in FIG. 3*a*, a first flange 511 is circumferentially arranged on the outer sidewall of the driving component housing 51, and a second flange 521 is circumferentially arranged on the outer sidewall of the driving component top cover 52, and a third flange 121 is circumferentially arranged on the inner sidewall of the housing 12 of the pump body 10. The second flange 521 is attached to the first flange 511, and the first flange 511 is overlapped on the third flange 121, and a first seal 122 is disposed between the first flange 511 and the third flange 121. In this way, the interior space between the top cover 20 and the pump body 10 can be sealed and isolated, so as to prevent liquid inside the pump body 10 from entering into the interior of the top cover 20 and damaging the parts inside the top cover 20.

As an embodiment of the present disclosure, as shown in FIG. 3*a*, the submersible pump further comprises a second screw 123, a third screw hole 124 formed on the third flange 121, and a fourth screw hole 26 formed on the inner wall of the top cover 20. The second screw 123 is threadedly connected with the fourth screw hole 26 through the third screw hole 124, so that the top cover 20 and the pump body 10 can be fixed more firmly.

As an embodiment of the present disclosure, as shown in FIG. 3*a*, a first slot 125 is formed on the third flange 121, and the top cover 20 comprises a first shell 27 and a second shell 28. The first shell 27 is formed on the side closer to the interior of the top cover 20, and the bottom of the first shell 27 can be engaged with the first slot 125. A second slot 126 is formed at the top edge of the housing 12 of the pump body 10, the bottom of the second shell 28 can be engaged with the second slot 126, and a second seal 127 is disposed between the second shell 28 and the second slot 126.

As an embodiment of the present disclosure, as shown in FIG. 3*a*, the fourth screw hole 26 is formed between the first shell 27 and the second shell 28, so that the top cover 20 and the pump body 10 can be fixed more firmly.

As an embodiment of the present disclosure, as shown in FIG. 3, a test hole 29 is further provided on the top of the top cover 20, and the test hole 29 is plugged by a third screw 291.

As an embodiment of the present disclosure, the submersible pump further comprises an annular handle 100, and the annular handle 100 has an annular plane perpendicular to the top surface of the top cover 20 so as to facilitate the pick-up, drop-down and movement of the submersible pump.

As an embodiment of the present disclosure, a non-slip protrusion 101 is provided on the inner surface of the annular handle 100 away from the top cover for providing friction when a hand in contact with the annular handle 100 to prevent slipping and falling damage.

Therefore, the submersible pump provided in the disclosure has a compact structure and is lightweight. As an embodiment of the present disclosure, the submersible pump is suitable for use as a domestic submersible pump, which is more convenient to use and easier to carry or move.

It should be understood by those of ordinary skill in the art that the disclosure is only specific embodiments of the present invention and is not intended to limit the present invention. Any modifications, equivalent replacements and improvements made within the spirit and principle of the present invention should be included in the scope of the present invention.

What is claimed:

1. A submersible pump, comprising a pump body and a top cover, wherein the pump body is detachably connected to the top cover, and there is a seal and isolation between the pump body and the inside of the top cover;
    the submersible pump also comprises a battery for powering the submersible pump, and the battery is provided within the top cover;
    the submersible pump comprises a battery box, wherein the battery box is provided within the top cover and the battery is embedded in the battery box;
    the battery box comprises a battery box body with an opening, a battery box cover and a first screw; a first hollow stud is arranged on an inner surface of the top cover; and
    a first screw hole is arranged on the battery box body and a second screw hole is arranged on the battery box cover, wherein the first screw passes through the second screw hole and the first screw hole to threadedly connect with the first hollow stud; or
    a first screw hole is arranged on the battery box body, wherein the first screw passes through the first screw hole to threadedly connect with the first hollow stud, and the battery box cover is fit with the battery box body by snap-fit connection;
    a drive circuit is further provided within the battery box;
    a first water outlet pipe is provided on a sidewall of the pump body, a second water outlet pipe is provided on a sidewall of the top cover, and a water outlet of the submersible pump is provided on the top of the second water outlet pipe and the second water outlet pipe forms a convex arm on a sidewall of the top cover;
    the submersible pump further comprises a float switch and an adjusting device, the float switch is connected with the drive circuit and the battery via a switch circuit, the adjusting device is provided on an outer sidewall of the convex arm, and one end of the float switch is connected to the adjusting device;
    the adjusting device comprises a U-shaped clip and a first rail and a second rail provided on an outer sidewall of the convex arm in a radial direction of the submersible pump, one end of the float switch is connected to the U-shaped clip, a first latch is provided equidistantly on the first rail and the second rail, a second latch is provided on the inner surfaces of both ends of the U-shaped clip, and the first latch and the second latch are able to be snap-fitted each other;

a driving component is further provided within the pump body and electrically connected with the drive circuit; wherein the driving component comprises a housing of the driving component and a top cover of the driving component;

a first flange is circumferentially arranged on an outer sidewall of the housing of the driving component, a second flange is circumferentially arranged on an outer sidewall of the top cover of the driving component, a third flange is circumferentially arranged on an inner sidewall of a housing of the pump body, and the second flange is attached to the first flange, the first flange abuts on the third flange, and a first seal is provided between the first flange and the third flange;

the submersible pump further comprises a second screw, wherein a third screw hole is formed on the third flange, a fourth screw hole is formed on an inner sidewall of the top cover, and the second screw passes through the third screw hole to threadedly connected with the fourth screw hole;

a first slot is formed on the third flange, and the top cover comprises a first shell and a second shell, wherein the first shell is formed on one side close to the interior of the top cover, the bottom of the first shell snap-fits with the first slot; a second slot is formed on top edge of the housing of the pump body, the bottom of the second shell snap-fits with the second slot, and a second seal is provided between the second shell and the second slot.

2. The submersible pump according to claim 1, wherein a second hollow stud is provided on the outer sidewall of the battery box body, the first screw hole is arranged on the center of the second hollow stud, and the first screw is capable of engaging with the second hollow stud by threaded connection.

3. The submersible pump according to claim 1, wherein a charging connector is provided on the top of the top cover, one end of the charging connector is exposed on the outer top surface of the top cover, and the other end of the charging connector is electrically connected with the drive circuit.

4. The submersible pump according to claim 3, wherein a waterproof cover is provided on the end of the charging connector exposed on the outer top surface of the top cover.

5. The submersible pump according to claim 1, further comprising a switch connecting line, wherein one end of the switch connecting line is electrically connected with the float switch, and the other end of the switch connecting line is electrically connected with the switch circuit.

6. The submersible pump according to claim 5, wherein a switch connector is provided on the top of the top cover, in which one end of the switch connector is exposed on the outer top surface of the top cover, and the other end of the switch connector is electrically connected with the switch circuit; the switch circuit is electrically connected with the drive circuit, and the switch connecting line is connected with the switch circuit via the switch connector.

7. The submersible pump according to claim 1, further comprises an impeller and a base, wherein the impeller is connected to an end of the driving component facing the base, a pressure chamber is formed between the housing of the driving component and the housing of the pump body, the base is provided on the bottom of the pump body, and a water inlet is provided on the base.

8. The submersible pump according to claim 7, wherein the driving component further comprises a a driving component driving unit, wherein the driving component driving unit is provided within an accommodating space formed inside the housing of the driving component and the top cover of the driving component.

\* \* \* \* \*